United States Patent [19]

Chambers et al.

[11] 4,277,447

[45] Jul. 7, 1981

[54] PROCESS FOR REDUCING CALCIUM ION CONCENTRATIONS IN ALKALINE ALKALI METAL CHLORIDE BRINES

[75] Inventors: Richard F. Chambers, Satsuma, Ala.; Nissim Rachima, Cleveland, Tenn.

[73] Assignee: Olin Corporation, New Haven, Conn.

[21] Appl. No.: 67,972

[22] Filed: Aug. 20, 1979

[51] Int. Cl.$^3$ .............................................. C01F 11/18
[52] U.S. Cl. ................................... 423/165; 210/702; 423/186; 204/98
[58] Field of Search ................... 210/45, 47, 42 R, 51, 210/52; 423/499, 165, 160, 161, 186; 204/98

[56] References Cited

U.S. PATENT DOCUMENTS

| Re. 1,290 | 3/1862 | Spencer | 423/499 |
|---|---|---|---|
| 33,424 | 10/1861 | Barker et al. | 423/499 |
| 273,256 | 3/1883 | Catlin | 423/499 |
| 1,500,126 | 7/1924 | Hanson et al. | 423/499 |
| 4,038,365 | 7/1977 | Patil et al. | 423/165 |
| 4,115,219 | 9/1978 | Gancy et al. | 423/165 |
| 4,155,820 | 5/1979 | Ogawa et al. | 423/165 |

*Primary Examiner*—Benoit Castel
*Attorney, Agent, or Firm*—James B. Haglind; Donald F. Clements

[57] ABSTRACT

A process for reducing calcium ion concentration in alkaline alkali metal chloride brines containing an alkali metal hydroxide is disclosed. The process comprises admixing an alkali metal bicarbonate with the alkaline brines to form an insoluble calcium salt, removing the insoluble calcium salt from the brine, and recovering a purified alkali metal chloride brine having reduced calcium ion concentration.

The process produces alkali metal chloride brines suitable for use in electrolytic diaphragm cells while substantially reducing the amount of acid required to neutralize the brines.

6 Claims, No Drawings

PROCESS FOR REDUCING CALCIUM ION CONCENTRATIONS IN ALKALINE ALKALI METAL CHLORIDE BRINES

This invention relates to improvements in the purification of aqueous solutions of alkali metal chlorides. More particularly, the invention concerns the removal of alkaline earth metal impurities from solutions of alkali metal chloride brines.

Aqueous solutions of alkali metal chlorides are used in the electrolytic production of chlorine and alkali metal hydroxides in electrolytic cells employing a diaphragm or membrane. It is well known that during electrolysis, the diaphragm or membrane is deleteriously affected by significant concentrations of alkaline earth metal ions such as calcium ions being present in the chloride solutions.

Conventionally acidic or neutral alkali metal chloride brines are treated by the addition thereto of an alkali metal carbonate and an alkali metal hydroxide to precipitate calcium carbonate and magnesium hydroxide. The treated brine is then clarified, filtered, and neutralized or acidified before being fed to the electrolytic cells. This treatment, however, is unsuitable for the removal of calcium ions from alkaline brines as excessive acid is required for neutralization or acidification of the treated brine.

It is an object of the present invention to provide a process for the removal of calcium metal ions from alkaline brines.

These and other objects of the invention are accomplished in a process for reducing calcium ion concentrations in alkaline alkali metal chloride brines containing an alkali metal hydroxide which comprises admixing an alkali metal bicarbonate with the alkaline alkali metal chloride brines to form an insoluble calcium compound, removing the insoluble calcium salt from the brines, and recovering an alkali metal chloride brine having reduced calcium ion concentrations.

More in detail, alkali metal chloride brines employed in electrolytic processes for the manufacture of chlorine and alkali metal hydroxides are produced primarily from subterranean deposits of alkali metal chlorides. These deposits also contain small quantities of alkaline earth metal salts such as calcium sulfate and magnesium chloride. The concentration of these alkaline earth metal salts in the brine is governed by their solubility. It is known, as taught, for example, in U.S. Pat. No. 3,606,466 issued Sept. 20, 1971, to D. P. Fernandes, to add a solution of an alkali metal hydroxide to solutions used in mining these salt deposits to produce precipitates of these alkaline earth metals and reduce their concentration in the brine. The treated brines recovered from the deposits are alkaline, but still contain excessive concentrations of calcium ions. The novel process of the present invention reduces the concentrations of calcium ions by treating these alkaline brines with an alkali metal bicarbonate.

Alkali metal chloride brines suitable for use in electrolytic processes are concentrated aqueous solutions whose concentration varies with the species of alkali metal. For example, where sodium chloride brines are electrolyzed, suitable aqueous solutions contain from about 150 to about 320 grams of sodium chloride per liter. Where potassium chloride or lithium chloride brines are used, concentrations corresponding to the values for sodium chloride are employed. The amounts of alkali metal hydroxide present in the brines to provide the alkalinity are, for example, from about 0.5 to about 4.0 and preferably from about 1.0 to about 2.0 grams per liter. Concentrations of calcium ions present in the alkaline brines which are suitably treated by the method of the present invention include those of from about 10 to about 1300 and usually from about 200 to about 500 parts per million.

Alkali metal bicarbonates such as sodium bicarbonate, potassium bicarbonate, or lithium bicarbonate may be added to the brine in any suitable form including granules or powders as well as aqueous solutions or slurries. While the bicarbonates used may be the pure or commercially available product, it is economically advantageous to employ solutions containing alkali metal bicarbonates which are prepared "on site". Dilute alkali metal hydroxides or cell liquors from a diaphragm cell are carbonated using, for example, flue gas as the source of $CO_2$. During the carbonation reaction, an alkali metal carbonate is first produced which upon additional carbonation produces the alkali metal bicarbonate. If desired, carbonation may be continued until all of the alkali metal carbonate produced has been converted to the bicarbonate. However, as the freezing point of solutions containing only alkali metal bicarbonates are higher than those containing mixtures of alkali metal carbonates and alkali metal bicarbonates, it is preferred to carry out the carbonation reaction until solutions are produced containing weight ratios of bicarbonate to carbonate of from about 5:1 to about 1:1, preferably from about 5:1 to about 2:1, and more preferably from about 5:1 to about 4:1.

Alkaline alkali metal chloride brines containing an alkali metal hydroxide as obtained from a brine well are treated with the alkali metal bicarbonate, preferably as an aqueous solution. No treatment of the brine is required prior to the addition of the alkali metal bicarbonate. Sufficient amounts of alkali metal bicarbonates are added to the brine solution to reduce the concentration of alkali metal hydroxide present in the brine to from about 0.1 to about 2.0, and preferably from about 0.2 to about 0.5 grams per liter of alkali metal hydroxide.

Following the addition of the bicarbonate to the alkaline brine, the calcium ion concentration is thought to be reduced by the precipitation of an insoluble calcium salt which is believed to be calcium carbonate formed by the reaction expressed by the following equations:

(1) $NaHCO_3 + NaOH \rightarrow Na_2CO_3 + H_2O$

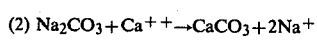

(2) $Na_2CO_3 + Ca^{++} \rightarrow CaCO_3 + 2Na^+$

Suitable amounts of alkali metal bicarbonate admixed with the alkaline brine are those which provide an excess of from about 0.3 to about 1.0 and preferably from about 0.5 to about 0.7 grams per liter of carbonate ion after precipitation of calcium ion.

Where a mixture of alkali metal bicarbonate and alkali metal carbonate is employed, the amount of alkali metal carbonate added is insufficient to supply the excess carbonate when the ratio of bicarbonate to carbonate is about 4:1, but may be sufficient to provide some precipitation of calcium at the lower ratios.

The process of the present invention is carried out with brines at ambient temperatures, for example, those in the range of from about 5° to about 45° C., however, the temperature is not critical and higher or lower temperatures may be used, if desired.

The bicarbonate treated brine flows to a settling tank and then through a separator such as a filter to remove the insoluble calcium compound. The brine having reduced calcium ion concentrations may be resaturated by the addition of alkali metal chloride salts. Resaturated brine is neutralized by the addition of an acid such as hydrochloric acid before being fed to the electrolytic cells.

Employing the process of the present invention, brines having a calcium ion concentration in the range of from about 0.5 to about 2.0 and preferably from about 0.5 to about 1.0 parts per million are obtained.

Where brines are required having yet lower concentrations of calcium ions, for example, in electrolytic cells employing membranes, the brine obtained by the process of the present invention may be subsequently treated, for example, using ion exchange processes, to further reduce the concentration of calcium ions.

The novel process of the present invention thus produces brines having greatly reduced concentrations of calcium ions while substantially reducing the amount of alkaline agents and neutralizing acids employed in the process which results in a significant cost savings.

The process of the present invention is further illustrated by the following examples. All percentages are by weight unless otherwise specified.

EXAMPLE 1

Alkaline sodium chloride brine (305 grams per liter of NaCl) was pumped from a brine well to a treatment tank at the rate of 1300 gallons per minute. The brine had a calcium ion concentration of 300 parts per million and contained 1 gram per liter of sodium hydroxide. Cell liquor, containing about 12 percent NaOH and about 12 percent of NaCl, was carbonated with flue gas containing carbon dioxide to produce a bicarbonate solution containing 56.3 grams per liter of sodium bicarbonate and 19.3 grams per liter of sodium carbonate (ratio of $NaHCO_3$ to $Na_2CO_3$ of 2.9:1). The bicarbonate solution ws fed to the brine treatment tank at the rate of 19 gallons per thousand gallons of brine. (Sodium carbonate added with the bicarbonate solution was equivalent to 0.37 grams per liter in the treated brine). Bicarbonated brine was added to a settling tank to permit insoluble impurities to form and precipitate. Brine from the settling tank was pumped to a sand filter, filtered and pumped to a holding tank. After filtration, the treated brine had a calcium concentration of 0.8 to 1.0 parts per million, a sodium carbonate concentration of 0.5 to 0.6 grams per liter, and a sodium hydroxide concentration of 0.4 grams per liter. Purified brine was removed from the holding tank, resaturated with sodium chloride salt, neutralized with hydrochloric acid and fed to a series of electrolytic diaphragm cells.

EXAMPLE 2

The procedure of Example 1 was followed exactly with the exceptions that the bicarbonate solution produced contained 40.8 grams per liter of sodium bicarbonate and 15.8 grams per liter of sodium carbonate (ratio of $NaHCO_3$ to $Na_2CO_3$ was 2.6:1), and the solution was fed to the treatment tank at a rate of 27 gallons per thousand gallons of brine. Purified brine from the filter had a calcium concentration of 0.8 to 1.0 parts per million, 0.5 to 0.6 grams per liter of sodium carbonate, and a sodium hydroxide concentration of 0.4 to 0.5 parts per million.

Examples 1 and 2 illustrate the effective reduction of calcium ions in sodium chloride brine solutions to concentrations suitable for use in electrolytic diaphragm cells using the novel process of the present invention. Examples 1 and 2 further show a significant reduction of sodium hydroxide alkalinity in the treated brine which permits a substantial reduction in the amount of acid required to neutralize the brine.

What is claimed is:

1. A process for reducing calcium ion concentration in alkaline alkali metal chloride brines containing from about 0.5 to about 4.0 grams per liter of an alkali metal hydroxide which comprises admixing an alkali metal bicarbonate with said alkaline alkali metal chloride brines to form an insoluble calcium salt, said alkali metal bicarbonate being admixed in an amount sufficient to provide said alkaline alkali metal chloride brines with an excess carbonate ion concentration of from about 0.3 to about 1.0 grams per liter after said formation of said insoluble calcium salt, removing said insoluble calcium salt from said brine, and recovering a purified alkali metal chloride brine having a calcium ion concentration from about 0.5 to about 2.0 parts per million and an alkali metal hydroxide concentration of from about 0.1 to about 2.0 grams per liter.

2. The process of claim 1 in which said alkali metal bicarbonate is admixed as an aqueous solution.

3. The process of claim 1 in which said alkali metal chloride is sodium chloride, said alkali metal hydroxide is sodium hydroxide, and said alkali metal bicarbonate is sodium bicarbonate.

4. The process of claim 1 in which said insoluble calcium salt is calcium carbonate.

5. The process of claim 1 in which said purified brine contains from about 0.5 to about 0.7 grams per liter of carbonate ion.

6. The process of claim 1 in which said purified brine contains from about 0.2 to about 0.5 grams per liter of said alkali metal hydroxide.

* * * * *